United States Patent
Glenny et al.

(10) Patent No.: US 10,776,237 B2
(45) Date of Patent: Sep. 15, 2020

(54) PROCESSOR PERFORMANCE MONITOR

(71) Applicant: GE Aviation Systems Limited, Cheltenham, Gloucestershire (GB)

(72) Inventors: Michael Glenny, Cheltenham (GB); James Angelo Elder, Cheltenham (GB); Peter James Handy, Cheltenham (GB)

(73) Assignee: GE Aviation Systems Limited, Cheltenham (GB)

(*) Notice: Subject to any disclaimer, the term of this patent is extended or adjusted under 35 U.S.C. 154(b) by 27 days.

(21) Appl. No.: 15/916,567

(22) Filed: Mar. 9, 2018

(65) Prior Publication Data

US 2018/0276097 A1 Sep. 27, 2018

(30) Foreign Application Priority Data

Mar. 27, 2017 (GB) .................................. 1704804.2

(51) Int. Cl.
| | |
|---|---|
| *G06F 11/00* | (2006.01) |
| *G06F 11/30* | (2006.01) |
| *G06F 13/42* | (2006.01) |
| *G06F 11/07* | (2006.01) |
| *G06F 11/34* | (2006.01) |

(52) U.S. Cl.
CPC ...... *G06F 11/3024* (2013.01); *G06F 11/0757* (2013.01); *G06F 11/3409* (2013.01); *G06F 13/4247* (2013.01)

(58) Field of Classification Search
CPC ............. G06F 11/3024; G06F 11/0757; G06F 11/3409; G06F 11/3466; G06F 11/0724; G06F 11/3006; G06F 11/3048

USPC .......................................................... 714/47
See application file for complete search history.

(56) References Cited

U.S. PATENT DOCUMENTS

| | | |
|---|---|---|
| 5,463,763 A | 10/1995 | Kubo |
| 5,752,047 A | 5/1998 | Darty et al. |
| 5,944,803 A | 8/1999 | Whitehouse |
| 7,496,788 B1 | 2/2009 | Alfieri et al. |
| 8,842,519 B2 | 9/2014 | Johnson et al. |

(Continued)

FOREIGN PATENT DOCUMENTS

JP   H08-305611 A   11/1996

OTHER PUBLICATIONS

Combined Search and Examination Report issued in connection with corresponding GB Application No. 1704804.2 dated Sep. 26, 2017.

*Primary Examiner* — Yair Leibovich
(74) *Attorney, Agent, or Firm* — Dority & Manning, P.A.

(57) ABSTRACT

One example aspect of the present disclosure is directed to a method for monitoring performance of a plurality of processors, wherein the plurality of processors are arranged in a daisy-chained ring configuration. The method includes receiving, by a first processor from the plurality of processors, a first signal from a second processor of the plurality of processors. The method includes determining, by the first processor, a status of the second processor based at least in part on whether the first received signal was received at a first expected interval. The method includes transmitting, by the first processor, a second signal to a third processor of the plurality of processors, wherein the third processor determines a status of the first processor based at least in part on whether the second signal was received at the third processor at a second expected interval.

20 Claims, 9 Drawing Sheets

(56) References Cited

U.S. PATENT DOCUMENTS

| | | | |
|---|---|---|---|
| 9,336,043 B2 | 5/2016 | Preston | |
| 2005/0273831 A1* | 12/2005 | Slomovich | H04N 7/181 |
| | | | 725/105 |
| 2007/0237072 A1* | 10/2007 | Scholl | H04L 12/66 |
| | | | 370/222 |
| 2009/0141621 A1* | 6/2009 | Fan | H04L 29/12009 |
| | | | 370/223 |
| 2012/0089861 A1 | 4/2012 | Cardinell et al. | |
| 2016/0200421 A1 | 7/2016 | Morisson | |

\* cited by examiner

PROCESSOR PERFORMANCE MONITOR

FIELD OF INVENTION

The present subject matter relates generally to aerial vehicles.

BACKGROUND OF THE INVENTION

An aerial vehicle can include one or more computing devices to assist in operations. The one or more computing devices can include a plurality of processors. Undetected failure of one of the plurality of processors can have dire consequences for the aerial vehicle. Traditional monitoring of the plurality of processors requires additional processors. The additional processors take up space and add to the cost of the one or more computing devices.

BRIEF DESCRIPTION OF THE INVENTION

Aspects and advantages of examples of the present disclosure will be set forth in part in the following description, or may be learned from the description, or may be learned through practice of the examples disclosed herein.

One example aspect of the present disclosure is directed to a method for monitoring performance of a plurality of processors, wherein the plurality of processors are arranged in a daisy-chained ring configuration. The method includes receiving, by a first processor from the plurality of processors, a first signal from a second processor of the plurality of processors. The method includes determining, by the first processor, a status of the second processor based at least in part on whether the first received signal was received at a first expected interval. The method includes transmitting, by the first processor, a second signal to a third processor of the plurality of processors, wherein the third processor determines a status of the first processor based at least in part on whether the second signal was received at the third processor at a second expected interval.

Another example aspect of the present disclosure is directed to a system for monitoring performance of a plurality of processors, wherein the plurality of processors are arranged in a daisy-chained ring configuration. The system includes a first processor of the plurality of processors. The first processor is configured to receive a first signal from a second processor of the plurality of processors. The first processor is configured to determine a status of the second processor based at least in part on whether the first received signal was received at a first expected interval. The first processor is configured to transmit a second signal to a third processor of the plurality of processors, wherein the third processor determines a status of the first processor based at least in part on whether the second signal was received at the third processor at a second expected interval.

Another example aspect of the present disclosure is directed to a system for monitoring processor performance. The system includes one or more memory devices. The system includes a plurality of processors, wherein the plurality of processors are arranged in a daisy-chained ring configuration such that each processor comprises a left adjacent processor and a right adjacent processor, wherein each processor performs a watchdog function for a monitored processor, wherein the monitored processor for each processor is one of the left adjacent processor and the right adjacent processor, wherein a performance of each processor is monitored by a supervisor processor, wherein the supervisor processor for each processor is the other of the left adjacent processor and the right adjacent processor. The watchdog functions comprise the processor configured to receive a first signal from the monitored processor. The watchdog functions comprise the processor configured to determine a status of the monitored processor based on the first received signal. The watchdog functions comprise the processor configured to transmit a second signal to the supervisor processor, wherein the supervisor processor determines a status of the processor based on the second signal.

Other example aspects of the present disclosure are directed to systems, methods, aerial vehicles, avionics systems, devices, non-transitory computer-readable media for monitoring processor performance. Variations and modifications can be made to these example aspects of the present disclosure.

These and other features, aspects and advantages of various examples will become better understood with reference to the following description and appended claims. The accompanying drawings, which are incorporated in and constitute a part of this specification, illustrate aspects of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
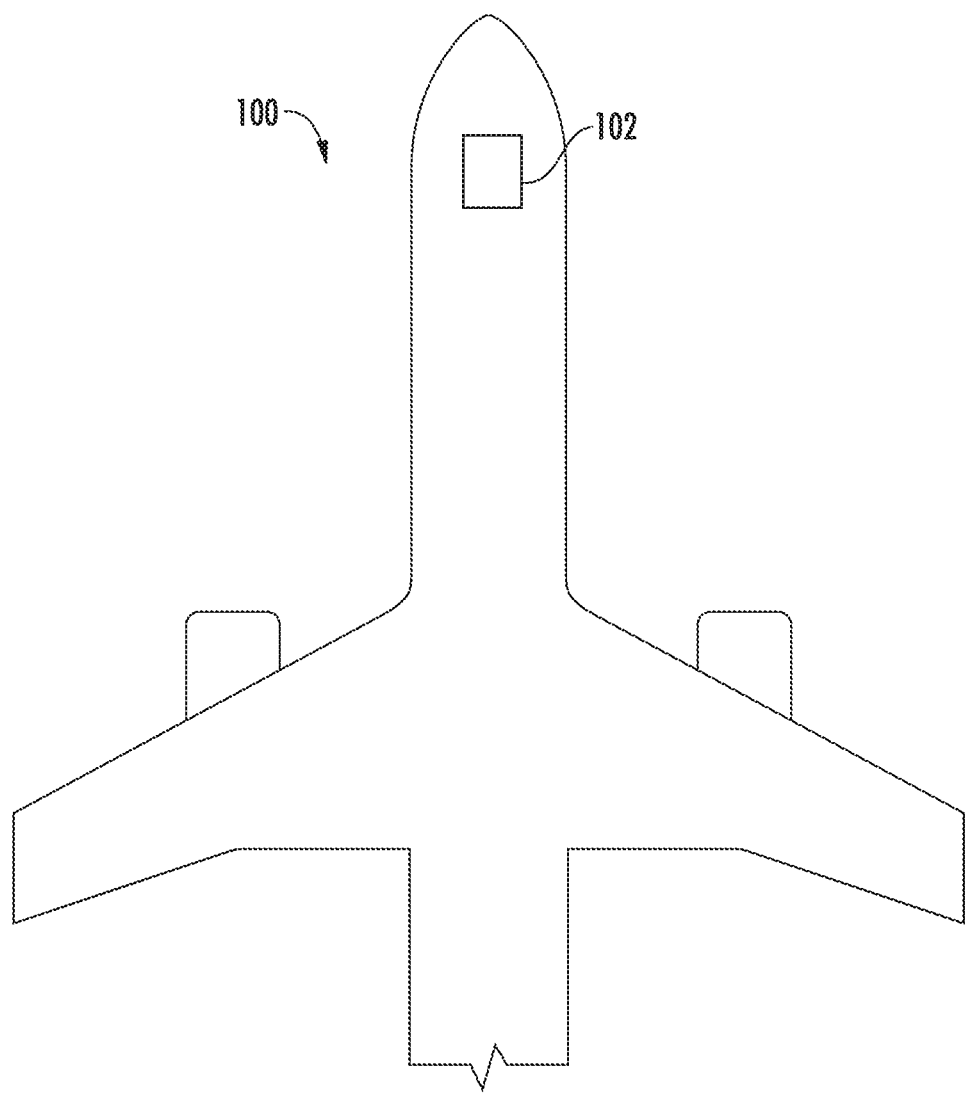
FIG. 1 depicts an aerial vehicle according to example embodiments of the present disclosure.

Reference now will be made in detail to embodiments, one or more examples of which are illustrated in the drawings. Each example is provided by way of explanation of the embodiments, not limitation of the embodiments. In fact, it will be apparent to those skilled in the art that various modifications and variations can be made in the present disclosure without departing from the scope or spirit of the invention. For instance, features illustrated or described as part of one embodiment can be used with another embodiment to yield a still further embodiment. Thus, it is intended that the present disclosure covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

Example aspects of the present disclosure are directed to methods and systems that can monitor performance of a plurality of processors. The plurality of processors can be arranged in a daisy-chain ring configuration, wherein each processor is connected to two other processors. In an embodiment, one of the processors connected to a processor can be considered a left adjacent processor and the other connected processor can be considered a right adjacent processor.

A first processor can transmit a signal to a second processor at regular intervals. The first processor can be said to be a monitored processor of the second processor. The second processor can be said to be a supervisor processor of the first processor. The signal can be said to be a heartbeat pulse. In an embodiment, each processor can be the supervisor processor for an associated left adjacent processor and itself be supervised by an associated right adjacent processor (or, in other words, be a monitored processor for the associated right adjacent processor). In another embodiment, each processor can be the supervisor processor for an associated right adjacent processor and itself be supervised by an associated left adjacent processor (or, in other words, be a monitored processor for the associated left adjacent processor).

If the supervisor processor does not receive the signal at the regular interval, or if the supervisor processor receives the signal, but the reception time of the signal is outside of the regular interval, then the supervisor processor can take corrective action on behalf of the monitored processor. Corrective action can include sending a reset signal to the monitored processor, causing the monitored processor to reset, reinitializing a program and/or data areas associated with the monitored processor, the like, and/or any combination of the foregoing. If a problem with the monitored processor persists, corrective action can include disabling the monitored processors, holding the monitored processor in a reset indefinitely, creating a notification for a user, the like, and/or any combination of the foregoing.

In this way, the systems and methods according to example aspects of the present disclosure can have a number of beneficial effects and benefits. For instance, example aspects of the present disclosure can have a technical effect of monitoring processor performance without increasing the size, weight, or cost of computing hardware.

In some embodiments, the systems and methods of the present disclosure also provide an improvement to a computing system in an aircraft. For instance, the methods and systems monitor performance of a plurality of processors. The plurality of processors can be arranged in a daisy-chained ring configuration. For example, the systems and methods can receive, by a first processor from the plurality of processors, a first signal from a second processor of the plurality of processors, determine, by the first processor, a status of the second processor based at least in part on whether the first received signal was received at a first expected interval, and transmit, by the first processor, a second signal to a third processor of the plurality of processors, wherein the third processor determines a status of the first processor based at least in part on whether the second signal was received at the third processor at a second expected interval. This can improve size, weight, and cost for computing hardware associated with the aircraft.

FIG. 1 depicts an example aerial vehicle 100 in accordance with example embodiments of the present disclosure. The aerial vehicle 100 can include one or more control systems 102 (described in more detail in FIG. 9 below). The one or more control systems 102 can include a plurality of processors. The performance of the plurality of processors of the one or more control systems 102 can be monitored using the methods and systems disclosed herein.

The numbers, locations, and/or orientations of the components of example aerial vehicle 100 are for purposes of illustration and discussion and are not intended to be limiting. Those of ordinary skill in the art, using the disclosures provided herein, shall understand that the numbers, locations, and/or orientations of the components of the aerial vehicle 100 can be adjusted without deviating from the scope of the present disclosure.

Figure 2:
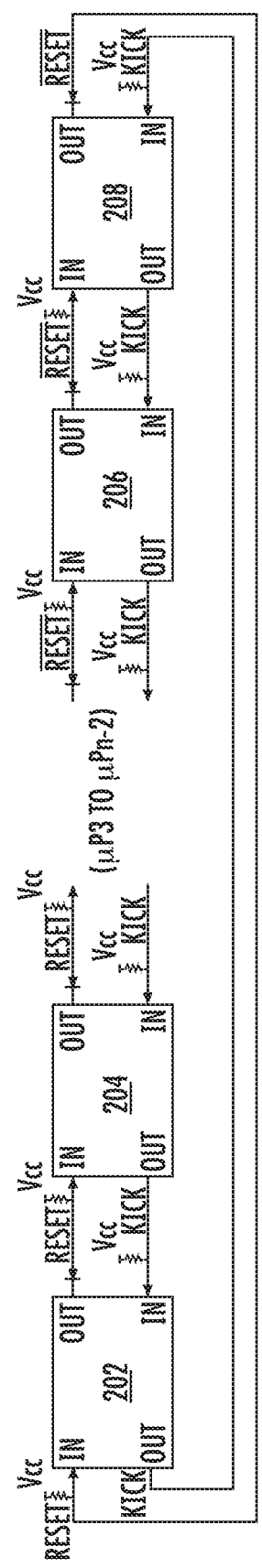
FIG. 2 depicts a block diagram of a plurality of processors according to example embodiments of the present disclosure.

FIG. 2 depicts a block diagram of a plurality of processors 202, 204, 206, 208 on a module 200 according to example embodiments of the present disclosure. For example, the plurality of processors 202, 204, 206, 208 can be a plurality of microprocessors. The plurality of processors 202, 204, 206, 208 can be arranged in a daisy-chained ring configuration. Each processor 202, 204, 206, 208 can have a left adjacent processor and a right adjacent processor. For example, a first processor 202 can have a last processor 208 as a left adjacent processor and a second processor 204 as a right adjacent processor. Similarly, the last processor 208 can have a second to last processor 206 as a left adjacent processor and the first processor 202 as a right adjacent processor. A processor 202, 204, 206, 208 can receive a heartbeat pulse (e.g., a signal transmitted at an interval) from its right adjacent processor. In such a configuration, each processor 202, 204, 206, 208 can be said to be a supervisor processor of its right adjacent processor. Additionally, in such a configuration, each processor 202, 204, 206, 208 can be said to be a monitored processor of its left adjacent processor. If the heartbeat pulse for a processor is received outside of the interval, or if an interval occurs with no heartbeat pulse, then the supervisor processor for the processor can transmit a reset signal to the processor. Although FIG. 2 displays each left adjacent processor as a supervisor processor and each right adjacent processor as a monitored processor, an embodiment is envisioned in which each left adjacent processor is a monitored processor and each right adjacent processor is a supervisor processor.

Figure 3:
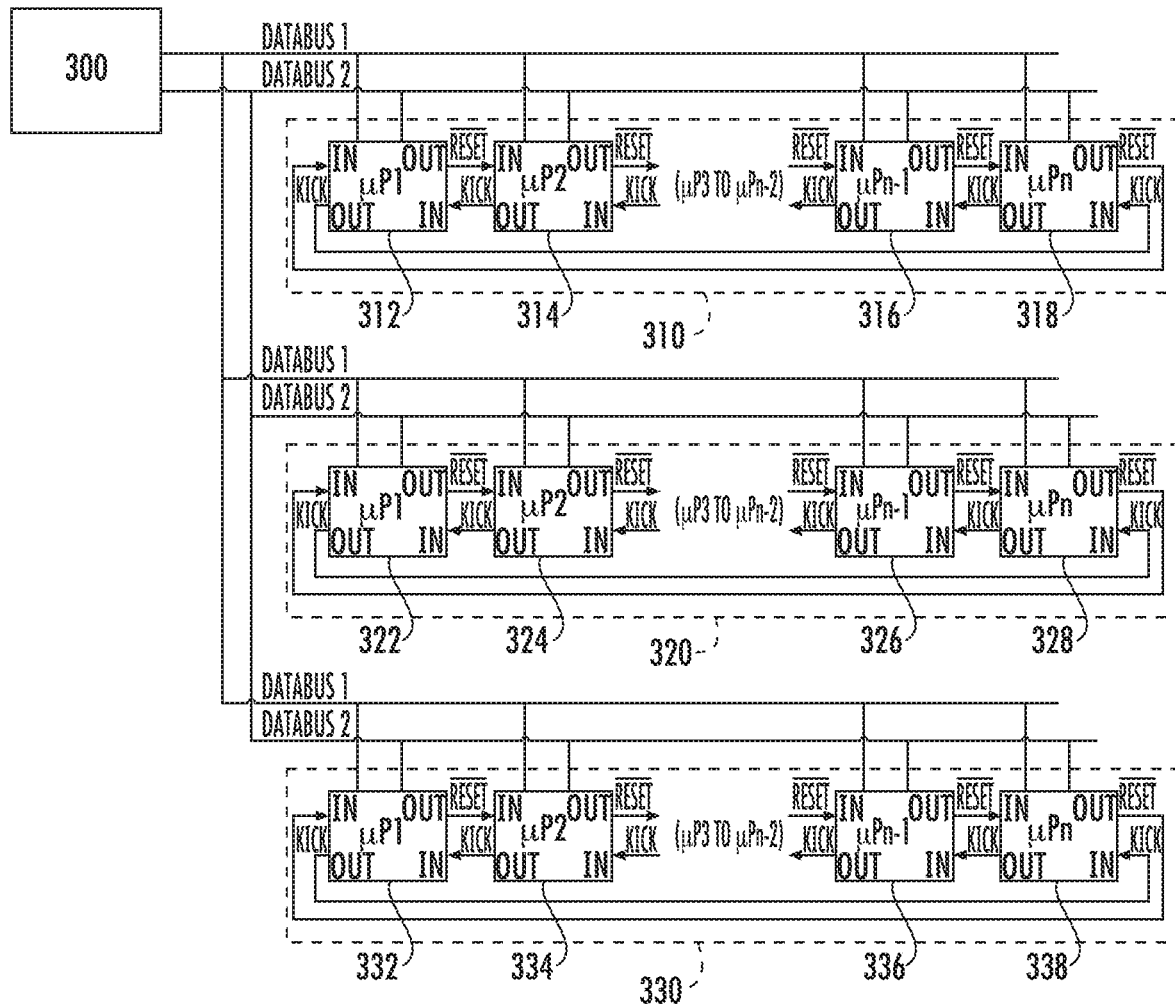
FIG. 3 depicts a block diagram of a plurality of modules according to example embodiments of the present disclosure.

FIG. 3 depicts a block diagram of a plurality of modules 310, 320, 330 according to example embodiments of the present disclosure. A system controller 300 can be in communication with each of the plurality of modules 310, 320, 330. Each module 310, 320, 330, can include a plurality of processors 312, 314, 316, 318, 322, 324, 326, 328, 332, 334, 336, 338 arranged in a daisy-chained ring configuration as described in FIG. 2. For example, Module 1 310 can include a plurality of processors 312, 314, 316, 318 arranged in a daisy-chained ring configuration as described in FIG. 2, Module 2 320 can include a plurality of processors 322, 324, 326, 328 arranged in a daisy-chained ring configuration as described in FIG. 2, and Module 3 330 can include a plurality of processors 332, 334, 336, 338 arranged in a daisy-chained ring configuration as described in FIG. 2.

Figure 4:
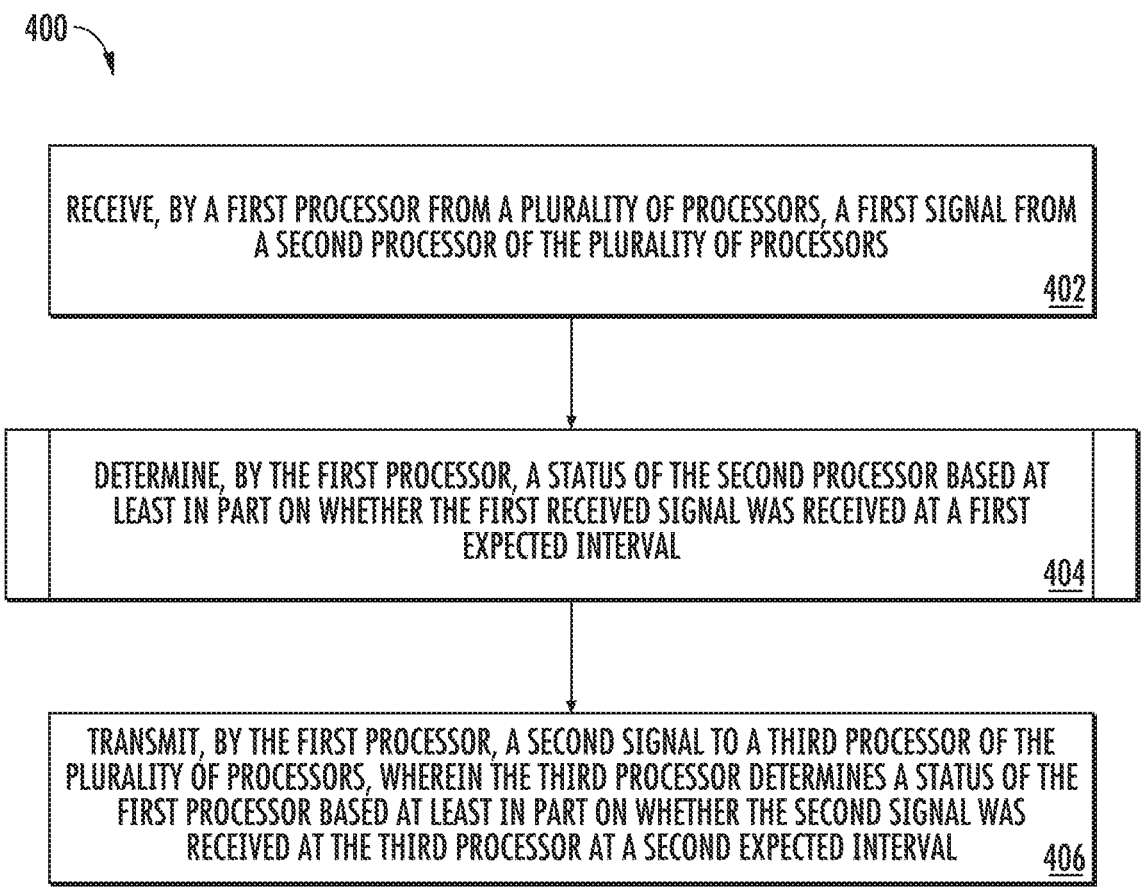
FIG. 4 depicts a flow diagram of an example method according to example embodiments of the present disclosure.

FIG. 4 depicts a flow diagram of an example method 400 for monitoring performance of a plurality of processors. The plurality of processors can be arranged in a daisy-chained ring configuration. The method of FIG. 4 can be implemented using, for instance, the one or more processor(s) 904 of the control system 900 of FIG. 9. FIG. 4 depicts steps performed in a particular order for purposes of illustration and discussion. Those of ordinary skill in the art, using the disclosures provided herein, will understand that various steps of any of the methods disclosed herein can be adapted, modified, rearranged, or modified in various ways without deviating from the scope of the present disclosure.

At (402), a first signal can be received from a second processor of the plurality of processors. For example, a first processor 904 of the plurality of processors 904 can receive a first signal from a second processor 904 of the plurality of processors 904. In an embodiment, a heartbeat pulse of the second processor can include the first signal. In an embodiment, the first processor can be a supervisor processor for the second processor. In an embodiment, the second processor can be a monitored processor for the first processor. In an embodiment, the second processor can be a left adjacent processor for the first processor. If the second processor is a left adjacent processor for the first processor, then the first processor can be a right adjacent processor for the second processor. In an embodiment, the second processor can be a right adjacent processor for the first processor. If the second processor is a right adjacent processor for the first processor, then the first processor can be a left adjacent processor for the second processor.

At (404), a status of the second processor can be determined based at least in part on whether the first received signal was received at a first expected interval. For example, the first processor 904 can determine a status of the second processor based at least in part on whether the first received signal was received at a first expected interval. At (406), a second signal can be transmitted to a third processor of the plurality of processors. For example, the first processor 904 can transmit a second signal to a third processor 904 of the plurality of processors 904. The third processor can determine a status of the first processor based at least in part on whether the second signal was received at the third processor at a second expected interval. In an embodiment, a heartbeat pulse of the first processor can include the second signal. In an embodiment, the third processor can be a supervisor processor for the first processor. In an embodiment, the first processor can be a monitored processor for the third processor. In an embodiment, the first processor can be a left adjacent processor for the third processor. If the first processor is a left adjacent processor for the third processor, then the third processor can be a right adjacent processor for the first processor. In an embodiment, the first processor can be a right adjacent processor for the third processor. If the first processor is a right adjacent processor for the third processor, then the third processor can be a left adjacent processor for the first processor.

Figure 5:
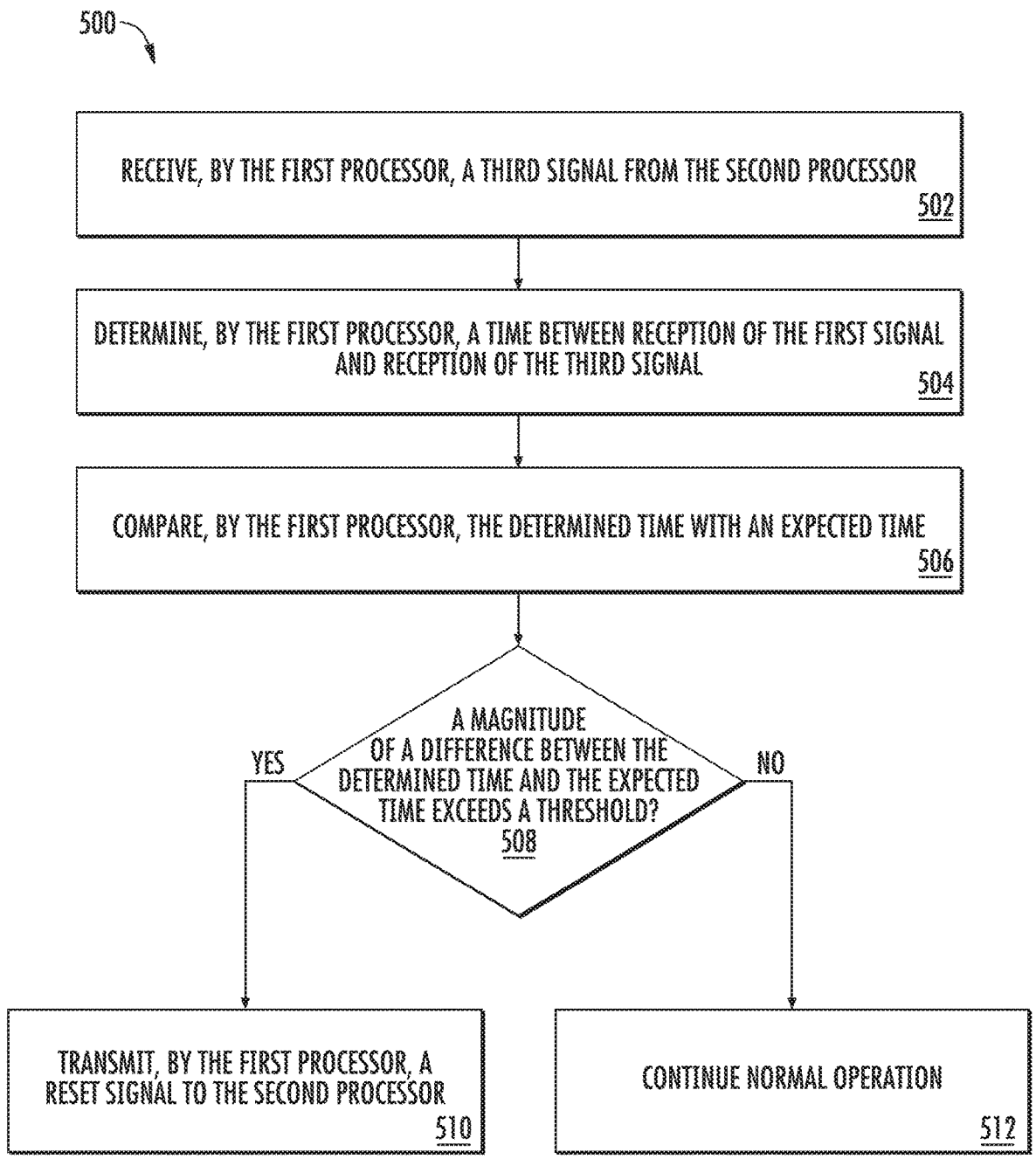
FIG. 5 depicts a flow diagram of an example method according to example embodiments of the present disclosure.

FIG. 5 depicts a flow diagram of an example method 500 for performing (404) of method 400. The method of FIG. 5 can be implemented using, for instance, the one or more processor(s) 904 of the control system 900 of FIG. 9. FIG. 5 depicts steps performed in a particular order for purposes of illustration and discussion. Those of ordinary skill in the art, using the disclosures provided herein, will understand that various steps of any of the methods disclosed herein can be adapted, modified, rearranged, or modified in various ways without deviating from the scope of the present disclosure.

At (502), a third signal can be received from the second processor. For example, the first processor 904 can receive a third signal from the second processor 904. At (504), a time between reception of the first signal and reception of the third signal can be determined. For example, the first processor 904 can determine a time between reception of the first signal and reception of the third signal. At (506), the determined time can be compared with an expected time. For example, the first processor 904 can compare the determined time with an expected time. At (508), a determination can be made of whether a magnitude of a difference between the determined time and the expected time exceeds a threshold. For example, the first processor 904 can determine whether a magnitude of a difference between the determined time and the expected time exceeds a threshold. At (510), when a magnitude of a difference between the determined time and the expected time exceeds a threshold, a reset signal can be transmitted to the second processor. For example, when a magnitude of a difference between the determined time and the expected time exceeds a threshold, the first processor 904 can transmit a reset signal to the second processor 904. The reset signal can cause the second processor to reset, reinitialize a program, reinitialize data areas, the like, and/or any combination of the foregoing. The reset signal can cause the second processor to disable, be held in an indefinite reset, the like, and/or any combination of the foregoing. At (512), when a magnitude of a difference between the determined time and the expected time does not exceed a threshold, normal operation can be continued. For example, when a magnitude of a difference between the determined time and the expected time does not exceed a threshold, the first processor 904 can continue normal operation.

Figure 6:
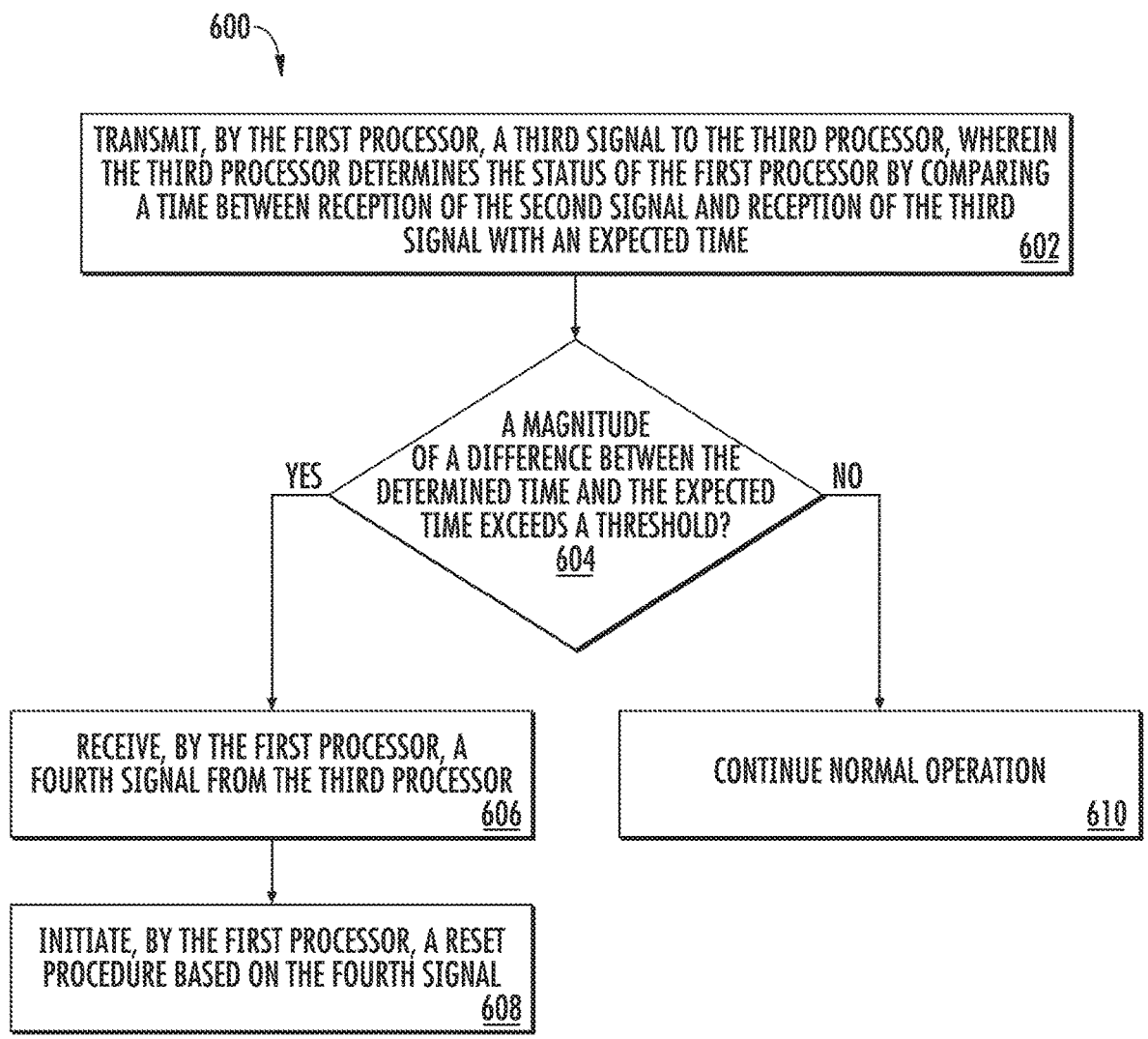
FIG. 6 depicts a flow diagram of an example method according to example embodiments of the present disclosure.

FIG. 6 depicts a flow diagram of an example method 600 for monitoring performance of a plurality of processors. The plurality of processors can be arranged in a daisy-chained ring configuration. The method of FIG. 6 can be implemented using, for instance, the one or more processor(s) 904 of the control system 900 of FIG. 9. FIG. 6 depicts steps performed in a particular order for purposes of illustration and discussion. Those of ordinary skill in the art, using the disclosures provided herein, will understand that various steps of any of the methods disclosed herein can be adapted, modified, rearranged, or modified in various ways without deviating from the scope of the present disclosure.

At (602), a third signal can be transmitted to the third processor. For example, the first processor 904 can transmit a third signal to the third processor 904. The third processor can determine the status of the first processor by comparing a time between reception of the second signal and reception of the third signal with an expected time. At (604), a determination can be made whether a magnitude of a difference between the determined time and the expected time exceeds a threshold. For example, the third processor 904 can determine whether a magnitude of a difference between the determined time and the expected time exceeds a threshold. At (606), when a magnitude of a difference between the determined time and the expected time exceeds a threshold, a fourth signal can be received from the third processor. For example, when a magnitude of a difference between the determined time and the expected time exceeds a threshold, the first processor 904 can receive a fourth signal from the third processor 904. At (608), when a magnitude of a difference between the determined time and the expected time exceeds a threshold, a reset procedure can be initiated based on the fourth signal. For example, when a magnitude of a difference between the determined time and the expected time exceeds a threshold, the first processor 904 can initiate a reset procedure based on the fourth signal. The fourth signal can cause the first processor to reset, reinitialize a program, reinitialize data areas, the like, and/or any combination of the foregoing. The fourth signal can cause the first processor to disable, be held in an indefinite reset, the like, and/or any combination of the foregoing. At (610), when a magnitude of a difference between the determined time and the expected time does not exceed a threshold, normal operation can be continued. For example, when a magnitude of a difference between the determined time and the expected time does not exceed a threshold, the first processor 904 can continue normal operation.

Figure 7:
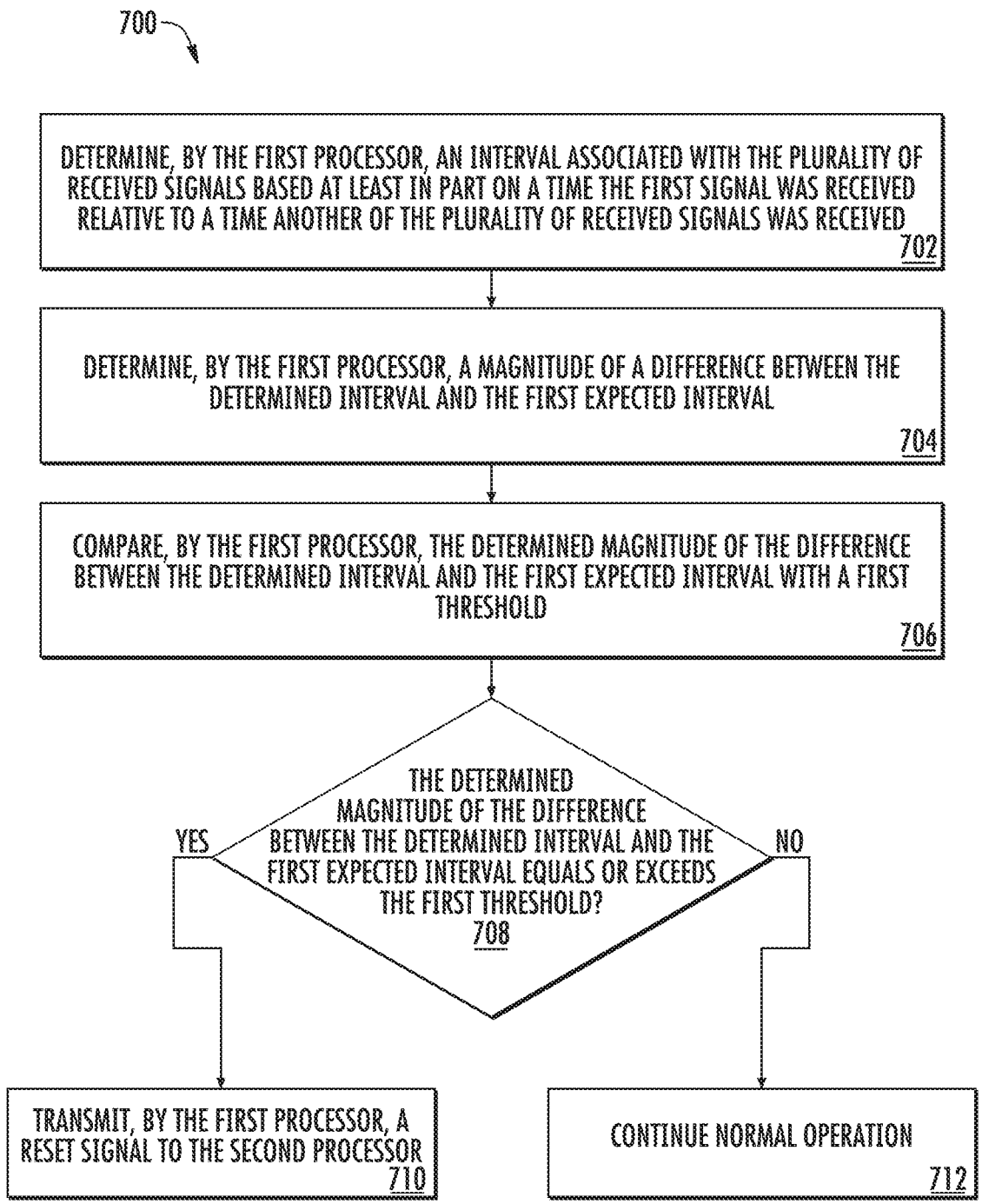
FIG. 7 depicts a flow diagram of an example method according to example embodiments of the present disclosure.

FIG. 7 depicts a flow diagram of an example method 700 for monitoring performance of a plurality of processors. The plurality of processors can be arranged in a daisy-chained ring configuration. The method of FIG. 7 can be implemented using, for instance, the one or more processor(s) 904 of the control system 900 of FIG. 9. FIG. 7 depicts steps performed in a particular order for purposes of illustration and discussion. Those of ordinary skill in the art, using the disclosures provided herein, will understand that various steps of any of the methods disclosed herein can be adapted, modified, rearranged, or modified in various ways without deviating from the scope of the present disclosure.

Optionally, the first signal can be one of a plurality of received signals from the second processor. At (702), an interval associated with the plurality of received signals can be determined based at least in part on a time the first signal was received relative to a time another of the plurality of received signals was received. For example, the first processor 904 can determine an interval associated with the plurality of received signals based at least in part on a time the first signal was received relative to a time another of the plurality of received signals was received.

At (704), a magnitude of a difference between the determined interval and the first expected interval can be determined. For example, the first processor 904 can determine a magnitude of a difference between the determined interval and the first expected interval. At (706), the determined magnitude of the difference between the determined interval and the first expected interval can be compared with a first threshold. For example, the first processor 904 can compare the determined magnitude of the difference between the determined interval and the first expected interval with a first threshold. At (708), a determination can be made of whether the determined magnitude of the difference between the determined interval and the first expected interval equals or exceeds the first threshold. For example, the first processor 904 can determine whether the determined magnitude of the difference between the determined interval and the first expected interval equals or exceeds the first threshold. At (710), when the determined magnitude of the difference between the determined interval and the first expected interval equals or exceeds the first threshold, a reset signal can be transmitted to the second processor. For example, when the determined magnitude of the difference between the determined interval and the first expected interval equals or exceeds the first threshold, the first processor 904 can transmit a reset signal to the second processor 904. The reset signal can cause the second processor to reset, reinitialize a program, reinitialize data areas, the like, and/or any combination of the foregoing. The reset signal can cause the second processor to disable, be held in an indefinite reset, the like, and/or any combination of the foregoing. At (712), when the determined magnitude of the difference between the determined interval and the first expected interval is less than the first threshold, normal operation can be continued. For example, when the determined magnitude of the difference between the determined interval and the first expected interval is less than the first threshold, the first processor 904 can continue normal operation.

Figure 8:
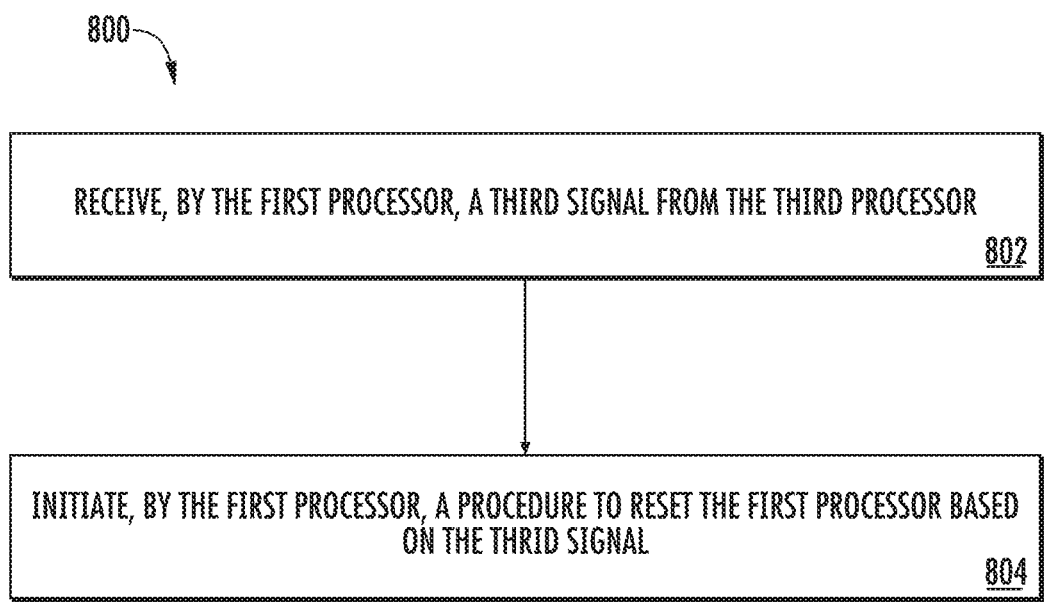
FIG. 8 depicts a flow diagram of an example method according to example embodiments of the present disclosure.

FIG. 8 depicts a flow diagram of an example method 800 for monitoring performance of a plurality of processors. The plurality of processors can be arranged in a daisy-chained ring configuration. The method of FIG. 8 can be implemented using, for instance, the one or more processor(s) 904 of the control system 900 of FIG. 9. FIG. 8 depicts steps performed in a particular order for purposes of illustration and discussion. Those of ordinary skill in the art, using the disclosures provided herein, will understand that various steps of any of the methods disclosed herein can be adapted, modified, rearranged, or modified in various ways without deviating from the scope of the present disclosure.

Optionally, the second signal can be one of a plurality of transmitted signals to the third processor. The third processor can determine a second interval associated with the plurality of transmitted signals based at least in part on a time the second signal was received by the third processor relative to a time another of the plurality of transmitted signals are received by the third processor. Optionally, the third processor can determine a magnitude of a difference between the second determined interval and the second expected interval. The third processor can compare the determined magnitude of the difference between the second determined interval and the second expected interval with a second threshold. When the determined magnitude of the difference between the second determined interval and the second expected interval equals or exceeds the second threshold, at (802), a third signal can be received from the third processor. For example, when the determined magnitude of the difference between the second determined interval and the second expected interval equals or exceeds the second threshold, the first processor 904 can receive a third signal from the third processor 904. When the determined magnitude of the difference between the second determined interval and the second expected interval equals or exceeds the second threshold, at (804), a procedure to reset the first processor can be initiated based on the third signal. For example, when the determined magnitude of the difference between the second determined interval and the second expected interval equals or exceeds the second threshold, the first processor 904 can initiate a procedure to reset the first processor 904 based on the third signal. The third signal can cause the first processor to reset, reinitialize a program, reinitialize data areas, the like, and/or any combination of the foregoing. The third signal can cause the first processor to disable, be held in an indefinite reset, the like, and/or any combination of the foregoing.

Figure 9:
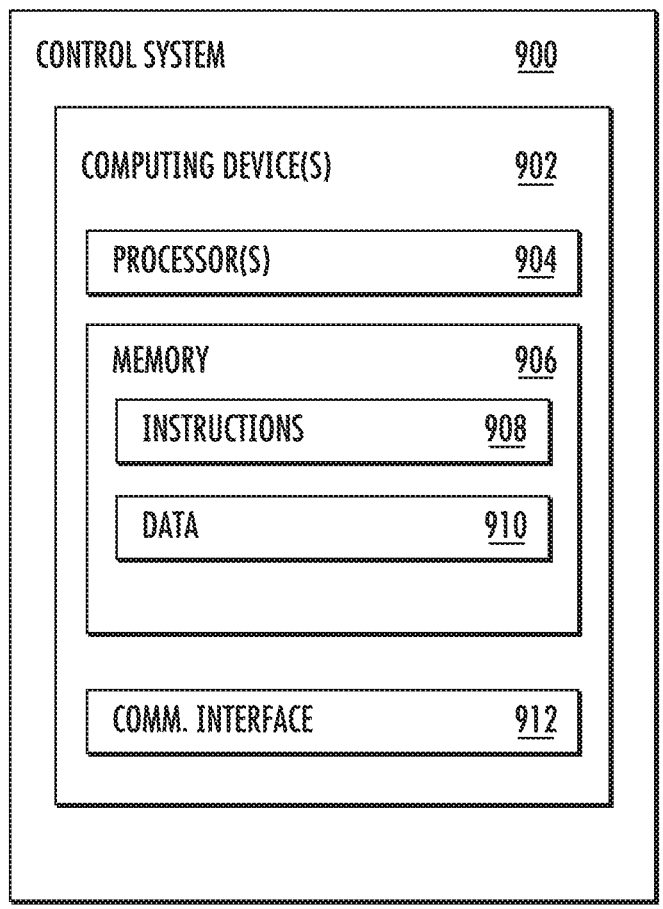
FIG. 9 depicts a control system for implementing one or more aspects according to example embodiments of the present disclosure.

FIG. 9 depicts a block diagram of an example control system 900 that includes a plurality of processor configured according to example embodiments of the present disclosure. As shown, the control system 900 can include one or more computing device(s) 902. The one or more computing device(s) 902 can include one or more processor(s) 904 and one or more memory device(s) 906. The one or more processor(s) 904 can include any suitable processing device, such as a microprocessor, microcontroller, integrated circuit, logic device, or other suitable processing device. Performance of the one or more processor(s) 904 can be monitored using the methods and systems described herein. The one or more memory device(s) 906 can include one or more computer-readable media, including, but not limited to, non-transitory computer-readable media, RAM, ROM, hard drives, flash drives, or other memory devices.

The one or more memory device(s) 906 can store information accessible by the one or more processor(s) 904, including computer-readable instructions 908 that can be executed by the one or more processor(s) 904. The instructions 908 can be any set of instructions that when executed by the one or more processor(s) 904, cause the one or more processor(s) 904 to perform operations. The instructions 908 can be software written in any suitable programming language or can be implemented in hardware. In some embodiments, the instructions 908 can be executed by the one or more processor(s) 904 to cause the one or more processor(s) 904 to perform operations, such as the operations for monitoring performance of the one or more processor(s) 904, as described with reference to FIG. 4.

The memory device(s) 906 can further store data 910 that can be accessed by the one or more processor(s) 904. For example, the data 910 can include any data used for monitoring performance of the one or more processor(s) 904, as described herein. The data 910 can include one or more table(s), function(s), algorithm(s), model(s), equation(s), etc. for monitoring performance of the one or more processor(s) 904 according to example embodiments of the present disclosure.

The one or more computing device(s) 902 can also include a communication interface 912 used to communicate, for example, with the other components of system. The communication interface 912 can include any suitable components for interfacing with one or more network(s), including for example, transmitters, receivers, ports, controllers, antennas, or other suitable components.

Figure 10:
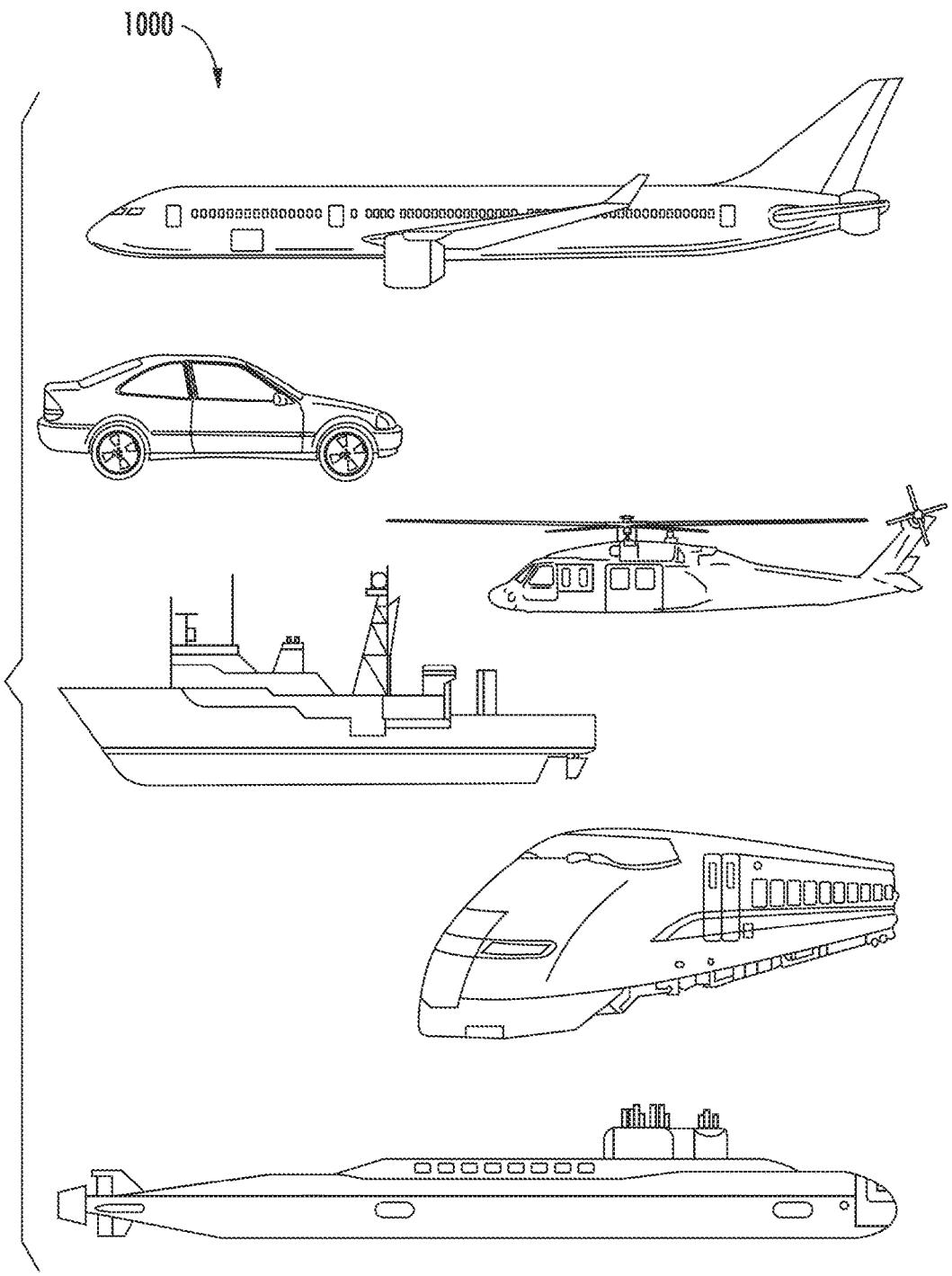
FIG. 10 depicts example vehicles according to example embodiments of the present disclosure.

Referring now to FIG. 10, example vehicles 1000 according to example embodiments of the present disclosure are depicted. The systems and methods of the present disclosure can be implemented on an aircraft, helicopter, automobile, boat, submarine, train, and/or any other suitable vehicles. While the present disclosure is described herein with reference to an aircraft implementation, this is intended only to serve as an example and not to be limiting. One of ordinary skill in the art would understand that the systems and methods of the present disclosure can be implemented on other vehicles without deviating from the scope of the present disclosure.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for monitoring performance of a plurality of processors, wherein the plurality of processors are arranged in a daisy-chained ring configuration, the method comprising:
   receiving, by a first processor from the plurality of processors, a first signal from a second processor of the plurality of processors;
   determining, by the first processor, a status of the second processor based at least in part on whether the first received signal was received at a first expected interval; and
   transmitting, by the first processor, a second signal to a third processor of the plurality of processors, wherein the third processor determines a status of the first processor based at least in part on whether the second signal was received at the third processor at a second expected interval.

2. The method of claim 1, wherein determining the status of the second processor based at least in part on whether the first received signal was received at the first expected interval further comprises:
   receiving, by the first processor, a third signal from the second processor;
   determining, by the first processor, a time between reception of the first signal and reception of the third signal; and
   comparing, by the first processor, the determined time with an expected time.

3. The method of claim 2, further comprising, when a magnitude of a difference between the determined time and the expected time exceeds a threshold, transmitting, by the first processor, a reset signal to the second processor.

4. The method of claim 1, further comprising transmitting, by the first processor, a third signal to the third processor, wherein the third processor determines the status of the first processor by comparing a determined time between reception of the second signal and reception of the third signal with an expected time.

5. The method of claim 4, further comprising:
   when a magnitude of a difference between the determined time and the expected time exceeds a threshold:
   receiving, by the first processor, a fourth signal from the third processor; and
   initiating, by the first processor, a reset procedure based on the fourth signal.

6. The method of claim 1, wherein the first signal is one of a plurality of received signals from the second processor, and wherein determining a status of the second processor based at least in part on whether the first received signal was received at the first expected interval comprises determining, by the first processor, an interval associated with the plurality of received signals based at least in part on a time the first signal was received relative to a time another of the plurality of received signals was received.

7. The method of claim 6, further comprising:
   determining, by the first processor, a magnitude of a difference between the determined interval and the first expected interval;

comparing, by the first processor, the determined magnitude of the difference between the determined interval and the first expected interval with a first threshold; and when the determined magnitude of the difference between the determined interval and the first expected interval equals or exceeds the first threshold, transmitting, by the first processor, a reset signal to the second processor.

8. The method of claim 7, wherein the second signal is one of a plurality of transmitted signals to the third processor, and wherein the third processor determines a second interval associated with the plurality of transmitted signals based at least in part on a time the second signal was received by the third processor relative to a time another of the plurality of transmitted signals are received by the third processor.

9. The method of claim 8, wherein the third processor determines a magnitude of a difference between the second determined interval and the second expected interval and compares the determined magnitude of the difference between the second determined interval and the second expected interval with a second threshold; and when the determined magnitude of the difference between the second determined interval and the second expected interval equals or exceeds the second threshold:

receiving, by the first processor, a third signal from the third processor; and initiating, by the first processor, a procedure to reset the first processor based on the third signal.

10. A system for monitoring performance of a plurality of processors, wherein the plurality of processors are arranged in a daisy-chained ring configuration, the system comprising:

a first processor of the plurality of processors configured to:

receive a first signal from a second processor of the plurality of processors;

determine a status of the second processor based at least in part on whether the first received signal was received at a first expected interval; and transmit a second signal to a third processor of the plurality of processors, wherein the third processor determines a status of the first processor based at least in part on whether the second signal was received at the third processor at a second expected interval.

11. The system of claim 10, wherein the first processor is further configured to:

receive a third signal from the second processor;

determine a time between reception of the first signal and reception of the third signal; and compare the determined time with an expected time.

12. The system of claim 11, wherein the first processor is further configured to, when a magnitude of a difference between the determined time and the expected time exceeds a threshold, transmit a reset signal to the second processor.

13. The system of claim 10, wherein the first processor is further configured to transmit a third signal to the third processor, wherein the third processor determines the status of the first processor by comparing a determined time between reception of the second signal and reception of the third signal with an expected time.

14. The system of claim 13, wherein, when a magnitude of a difference between the determined time and the expected time exceeds a threshold, the first processor is further configured to:

receive a fourth signal from the third processor; and initiate a reset procedure based on the fourth signal.

15. The system of claim 10, wherein the first signal is one of a plurality of received signals from the second processor, and wherein the first processor is further configured to determine an interval associated with the plurality of received signals based at least in part on a time the first signal was received relative to a time another of the plurality of received signals was received.

16. The system of claim 15, wherein the first processor is further configured to:

determine a magnitude of a difference between the determined interval and the first expected interval;

compare the determined magnitude of the difference between the determined interval and the first expected interval with a first threshold; and when the determined magnitude of the difference between the determined interval and the first expected interval equals or exceeds the first threshold, transmit a reset signal to the second processor.

17. The system of claim 16, wherein the second signal is one of a plurality of transmitted signals to the third processor, and wherein the third processor determines a second interval associated with the plurality of transmitted signals based at least in part on a time the second signal was received by the third processor relative to a time another of the plurality of transmitted signals are received by the third processor.

18. The system of claim 17, wherein the third processor determines a magnitude of a difference between the second determined interval and the second expected interval, compares the determined magnitude of the difference between the second determined interval and the second expected interval with a second threshold; and when the determined magnitude of the difference between the second determined interval and the second expected interval equals or exceeds the second threshold, the first processor is further configured to:

receive a third signal from the third processor; and initiate a procedure to reset the first processor based on the third signal.

19. A system for monitoring processor performance comprising:

one or more memory devices;

a plurality of processors, wherein the plurality of processors are arranged in a daisy-chained ring configuration such that each processor comprises a left adjacent processor and a right adjacent processor, wherein each processor performs a watchdog function for a monitored processor, wherein the monitored processor for each processor is one of the left adjacent processor and the right adjacent processor, wherein a performance of each processor is monitored by a supervisor processor, wherein the supervisor processor for each processor is the other of the left adjacent processor and the right adjacent processor, and wherein the watchdog function comprises each the processor configured to:

receive a first signal from the monitored processor;

determine a status of the monitored processor based on the first received signal; and transmit a second signal to the supervisor processor, wherein the supervisor processor determines a status of the processor based on the second signal.

20. The system of claim 19, wherein the processor is further configured to:
   receive a third signal from the monitored processor;
   determine a time between reception of the first signal and reception of the third signal; and
   compare the determined time with an expected time.

* * * * *